US012504161B2

(12) United States Patent
Mao

(10) Patent No.: US 12,504,161 B2
(45) Date of Patent: Dec. 23, 2025

(54) SHELL ASSEMBLY, LIGHTING LAMP HEAD AND HEADLAMP DEVICE

(71) Applicant: Ningbo Sunree Outdoor Products Co., Ltd., Cixi (CN)

(72) Inventor: Huanjun Mao, Cixi (CN)

(73) Assignee: Ningbo Sunree Outdoor Products Co., Ltd., Cixi (CN)

(*) Notice: Subject to any disclaimer, the term of this patent is extended or adjusted under 35 U.S.C. 154(b) by 0 days.

(21) Appl. No.: 18/781,574

(22) Filed: Jul. 23, 2024

(65) Prior Publication Data

US 2025/0383075 A1 Dec. 18, 2025

(30) Foreign Application Priority Data

Jun. 18, 2024 (CN) ........................ 202421395421.4

(51) Int. Cl.

| | |
|---|---|
| ***F21V 31/00*** | (2006.01) |
| ***F21S 9/03*** | (2006.01) |
| ***F21V 15/01*** | (2006.01) |
| ***F21V 17/16*** | (2006.01) |
| ***F21V 21/08*** | (2006.01) |
| ***F21V 21/084*** | (2006.01) |

(52) U.S. Cl.

CPC ............ *F21V 31/005* (2013.01); *F21S 9/037* (2013.01); *F21V 15/01* (2013.01); *F21V 17/164* (2013.01); *F21V 21/0816* (2013.01); *F21V 21/084* (2013.01)

(58) Field of Classification Search

CPC ...... F21V 31/005; F21V 15/01; F21V 17/164; F21V 21/0816; F21V 21/084; F21S 9/037

See application file for complete search history.

(56) References Cited

U.S. PATENT DOCUMENTS

| | | | | |
|---|---|---|---|---|
| 10,782,006 | B1 * | 9/2020 | Ross | F21V 23/0435 |
| 11,333,333 | B1 * | 5/2022 | Hwang | F21S 9/037 |
| 2013/0301242 | A1 * | 11/2013 | Sharrah | F21V 5/006 362/105 |
| 2014/0198484 | A1 * | 7/2014 | Feustel | F21L 4/04 362/105 |
| 2015/0192282 | A1 * | 7/2015 | Ormsbee | F21L 4/04 315/307 |
| 2017/0184259 | A1 * | 6/2017 | Li | F21V 21/084 |
| 2022/0003396 | A1 * | 1/2022 | Saboo | F21V 21/30 |
| 2022/0178522 | A1 * | 6/2022 | Cabot | F21V 21/0816 |

* cited by examiner

*Primary Examiner* — Tsion Tumebo

(74) *Attorney, Agent, or Firm* — Rhodes IP PLC; Christopher R Rhodes

(57) ABSTRACT

A shell assembly, a lighting lamp head and a headlamp device. The shell assembly is applied to the lighting lamp head. The shell assembly includes: a rear shell; a front shell including a first shell body and a second shell body, the first shell body is connected to the rear shell, and the first shell body and the rear shell define an accommodating cavity, the second shell body is disposed outside the first shell body and is integrated with the first shell body; a sealing element arranged in the accommodating cavity and disposed at an edge of a first port of the first shell body, and a portion of the second shell body extends through the first shell body and is integrated with the sealing element.

10 Claims, 7 Drawing Sheets

SHELL ASSEMBLY, LIGHTING LAMP HEAD AND HEADLAMP DEVICE

TECHNICAL FIELD

The present disclosure relates to the technical field of lighting equipment, in particular, to a shell assembly, a lighting lamp head and a headlamp device.

BACKGROUND

Headlamp is a helpful equipment in outdoor activities, which is widely used in such as night emergency repair, night camping, and underground construction.

Currently, when a headlamp is in a wet condition, such as a rainy day, there is a safety risk that water vapor enters the headlamp from a connection point of the shell assembly of the headlamp, due to poor sealing of the shell assembly of the headlamp, which may damage electronic components inside the headlamp. Therefore, it is necessary to improve sealing performance of the shell assembly of the headlamp.

SUMMARY

The embodiment of the present disclosure provides a shell assembly, a lighting lamp head and a headlamp device, which can solve the problem of poor sealing of the shell assembly of the headlamp in the relevant technology.

In a first aspect, an embodiment of this disclosure provides a shell assembly applied to a lighting lamp and including a rear shell, a front shell, and a sealing element, the front shell includes a first shell body and a second shell body, the first shell body is connected to the rear shell enclosed with the rear shell to form an accommodating cavity, the second shell body encloses outside the first shell body and is integrally constructed with the first shell body; the sealing element is disposed in the accommodating cavity and is provided at an edge of a first port of the first shell body, and a portion of the second shell body extends through the first shell body and is integrally constructed with the sealing element.

In a second aspect, an embodiment of this disclosure provides a lighting lamp head including a photovoltaic unit and the aforementioned shell assembly, the first shell body and the second shell body have corresponding lighting passages, the photovoltaic unit is at least partially located in the accommodating cavity and arranged corresponding to the lighting passages.

In a third aspect, an embodiment of this disclosure provides a headlamp device, which includes a head assembly and the aforementioned lighting lamp head, the lighting lamp head further includes a mounting bracket, the mounting bracket is rotatably connected to the rear shell, the mounting bracket has a lamp head mounting feature, and the head assembly is connected to the mounting bracket corresponding to the lamp head mounting feature.

Based on the shell assembly, the lighting lamp head and the headlamp device in the embodiment of the present disclosure, by designing the sealing element and setting it at the edge of the first port of the first shell, the sealing element can play a good sealing effect on the connecting position of the first port of the first shell and the second port of the rear shell, effectively reducing the possibility of water vapor entering into the accommodating cavity from the connecting position of the first port of the first shell and the second port of the rear shell and damaging the electronic components inside the lighting lamp head, thereby effectively improving sealing performance of the shell assembly of the lighting lamp head. By designing the first shell body configured as an inner shell of the front shell and mainly used for connecting with the rear shell, relative fixation of the front shell and the rear shell is realized. By designing the second shell body configured as an outer shell of the front shell and mainly used for connecting with the sealing element, relative fixation of the sealing element and the front shell is realized. By designing the first and the second shell body, the front shell forms a double shell structure with inner and outer shells, which can effectively enhance the structural strength of the front shell to achieve the purpose of enhancing the overall structural strength of the shell assembly, so as to enhance the anti-drop performance of the lighting lamp head. By designing the second shell body and the first shell body to be integrally constructed, the producing difficulty of the second shell body and the first shell body can be effectively reduced; by designing the sealing element and the second shell body to be integrally constructed, the producing difficulty of the sealing element and the second shell body can be effectively reduced.

BRIEF DESCRIPTION OF THE DRAWINGS

In order to more clearly illustrate the technical solutions in the embodiments of the present application or in the prior art, the following is a brief introduction to the drawings that will be used in the description of the embodiments or prior art. It is evident that the drawings described below are merely some embodiments of the present application. For those skilled in the art, without the need for creative effort, other drawings can be obtained based on these drawings.

Reference lists: 10, lighting lamp head; 10*a*, shell assembly; 11, front shell; 111, first shell body; 111*a*, first light outlet; 111*b*, first port; 111*c*, perforation; 111*d*, recess; 112, second shell body; 112*a*, second light outlet; 112*b*, shell body part; 112*c*, connecting end; 1112, first connection portion; 1113, USB hole; 12, rear shell; 12*a*, second port; 13, sealing element; 131, annular sealing ring; 14, mounting seat; 14*a*, first side; 14*b*, second side; 15. photovoltaic unit; 151, circuit board; 152. light source; 153, battery; 154, lens; 155, voice control module; 156, low-temperature alarm; 16, mounting bracket; 17, handle.

DETAILED DESCRIPTION

In order to make the purpose, technical solutions and advantages of the disclosure more clear, the disclosure is further explained in detail in combination with the drawings and embodiments. It should be understood that the specific embodiments described herein are used only to interpret the disclosure and not to limit the disclosure.

Figure 1:
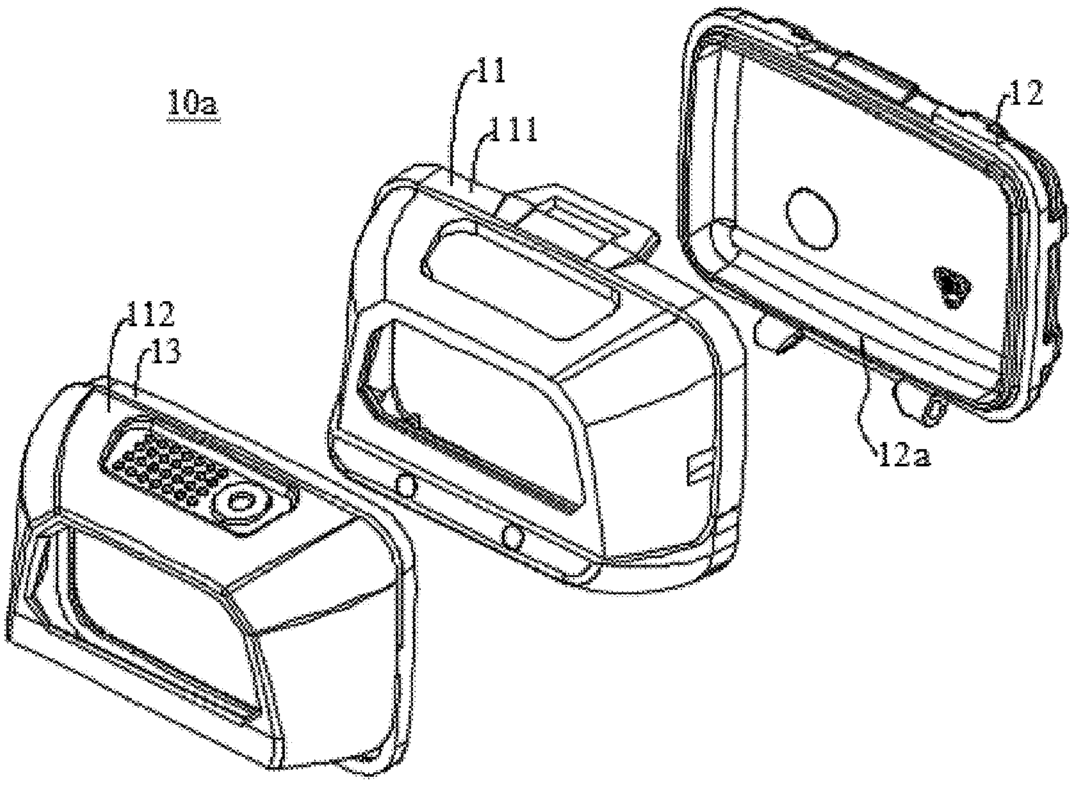
FIG. 1 is an exploded view of a shell assembly according to an embodiment of the present disclosure.
Figure 2:
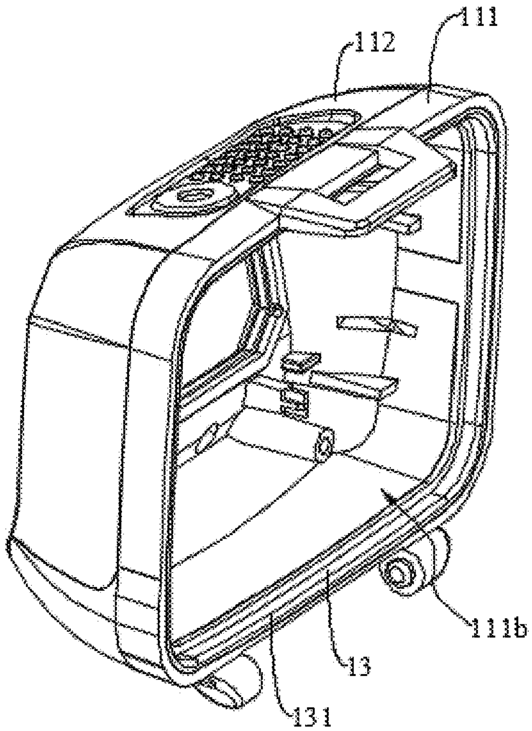
FIG. 2 is a view of a front shell according to an embodiment of the present disclosure.
Figure 3:
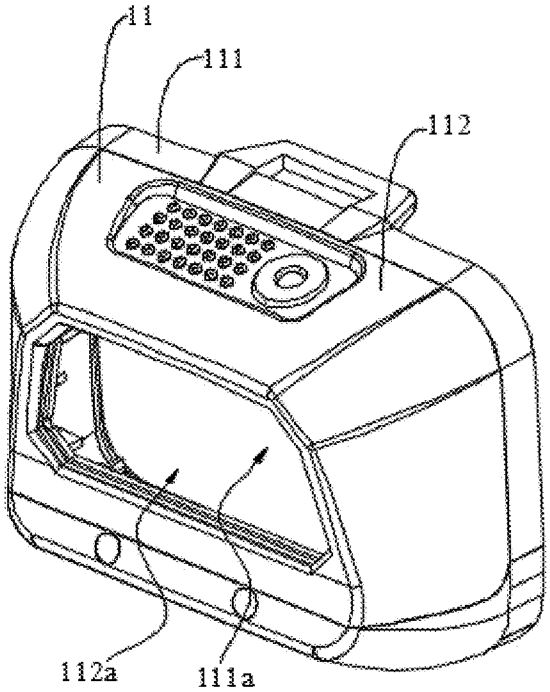
FIG. 3 is another view of the front shell of FIG. 2.

Referring to FIGS. 1-3, a first aspect of the present disclosure provides a shell assembly 10*a* with an improved sealing, which effectively reduces a risk of water vapor entering the lighting lamp device and damaging electronic components.

The shell assembly 10*a* is applied to a lighting lamp head 10. The shell assembly 10*a* includes a rear shell 12, a front shell 11, and a sealing element 13, the front shell 11 includes a first shell body 111 and a second shell body 112. The first shell body 111 is connected to the rear shell 12, and the first shell body 111 is enclosed with the rear shell 12 together to form an accommodating cavity, the second shell body 112 encloses outside the first shell body 111 and is integrally formed with the first shell body 111. The sealing element 13 is located in the accommodating cavity and is provided at an edge of a first port 111*b* of the first shell body 111. A part of the second shell body 112 extends through the first shell body 111 and is integrally formed with the sealing element 13.

The specific structure of the shell assembly 10*a* is introduced below in combination with FIGS. 1-5.

As shown in FIGS. 1-5, the shell assembly 10*a* includes a rear shell 12, a front shell 11 and a sealing element 13.

The rear shell 12 is a shell of the shell assembly 10*a*, the specific material of the rear shell 12 is not limited, and can be reasonably selected according to actual requirements. For example, the material of the rear shell 12 can be, but not limited to, plastic, silicone or resin.

The front shell 11 is another shell of the shell assembly 10*a*, the specific material of the front shell 11 is not limited, and can be reasonably selected according to actual requirements. For example, the material of the front shell 11 can be, but not limited to, plastic, silicone or resin.

The front shell 11 includes a first shell body 111 and a second shell body 112. The first shell body 111 is connected to the rear shell 12, and together they enclose the accommodating cavity, together with the rear shell 12. The rear shell 12 encloses outside the first shell body 111 and is integrally formed with the first shell body 111. The accommodating cavity defines a space of the shell assembly 10*a* for elements, such as a photovoltaic unit 15 (described below), and the accommodating cavity is formed by the first shell body 111 and the rear shell 12. The specific shape of the accommodating cavity is not defined, and can be reasonably designed according to actual requirements. It can be understood that the specific shape of the accommodating cavity depends on the specific structure of the first shell body 111 and the rear shell 12. The first shell body 111 is an inner shell body of the front shell 11, which can be, but not limited to, removably connected to the rear shell 12 by, such as, screwing, jamming, or inserting. In an embodiment, the first shell body 111 is connected to the rear shell 12 by snap-fit. The second shell body 112 is an outer shell body of the front shell 11, and the second shell body 112 may completely encompass the first shell body 111, or encompass a portion of the first shell body 111. The second shell body 112 may, but not limited to, form an integral structure with the first shell body 111 by injection molding or 3D printing.

The first shell body 111 has a first port 111*b*, the specific shape of the first port 111*b* is not limited, and a designer may reasonably design it according to actual requirements, for example, the specific shape of the first port 111*b* may be, but not limited to, circular or rectangular. The rear shell 12 has a second port 12*a*, the specific shape of the second port 12*a* is not limited, and a designer may reasonably design it according to actual requirements, for example, the specific shape of the second port 12*a* may be, but not limited to, round or rectangular. The first shell body 111 is connected to the rear shell 12 to align the first port 111*b* with the second port 12*a*.

As shown in FIGS. 1-5, the sealing element 13 is a member for effectively sealing connecting points of the first port 111*b* of the first shell body 111 and the second port 12*a* of the rear shell 12. The details of the sealing element 13 will be described below.

The sealing element 13 is located in the accommodating cavity and disposed at an edge of the first port 111*b* of the first shell body 111, so that the sealing element 13 enables effective sealing of the first port 111*b* of the first shell body 111 and the second port 12*a* of the rear shell 12 when the first shell body 111 is connected to the rear shell 12 and the first port 111*b* aligns with the second port 12*a*. Of course, the sealing element 13 can be additionally disposed at an edge of the second port 12*a* of the rear shell 12, so that the sealing element 13 enables double sealing at the connecting points of the first port 111*b* of the first shell body 111 and the second port 12*a* of the rear shell 12 when the first shell body 111 is connected to the rear shell 12 and the first port 111*b* aligns with the second port 12*a*.

The portion of the second shell body 112 extends through the first shell body 111 and is integrated with the sealing element 13, wherein the sealing element 13 forms an integral structure with the second shell body 112, such as, by injection molding or 3D printing. Of course, when the sealing element 13 is also disposed at the edge of the second port 12*a* of the rear shell 12, the sealing element 13 is also integrated with the rear shell 12.

According with the shell assembly 10*a* in the embodiment of this disclosure, by providing the sealing element 13 disposed at the edge of the first port 111*b* of the first shell body 111, the sealing element 13 can provide a good seal at the connecting points of the first port 111*b* of the first shell body 111 and the second port 12*a* of the rear shell 12, and effectively reduces possibility of water vapor entering the accommodating cavity from the connection point between the first port 111*b* of the first shell body 111 and the second port 12*a* and damaging the electronic components of the lighting lamp head 10. Therefore, the sealing performance of the shell assembly 10*a* of the lighting lamp head 10 is effectively enhanced. By designing the first shell body 111, the first shell body 111 (as the inner shell body of the front shell 11) is mainly used for connecting with the rear shell 12, which enables relative fixation of the front shell 11 and the rear shell 12. By designing the second shell body 112, the second shell body 112 (as the outer shell body of the front shell 11) is mainly used for connecting with the sealing element 13, which enables relative fixation of the sealing element 13 and the front shell 11. By designing the first shell body 111 and the second shell body 112, the front shell 11 is formed as a double-shell component with an inner part and an outer covered part, which can effectively enhance the structural strength of the front shell 11, and thus enhance the overall structural strength of the shell assembly 10*a*, and be beneficial to enhancing the anti-fall performance of the lighting lamp head 10. By designing the second shell body 112 and the first shell body 111 which are integral, machining difficulty of the second shell body 112 and the first shell body 111 is effectively reduced. By designing the sealing element 13 and the second shell body 112, machining difficulty of the sealing element 13 and the second shell body 112 is effectively reduced.

Furthermore, as shown in FIGS. 1-5, the specific manufacturing means of the first shell body 111 and the second shell body 112, the specific manufacturing means of the sealing element 13 and the second shell body 112 may be, but not limited to, one or more of the following embodiments.

In a first embodiment, the second shell body 112 is integrated with the first shell body 111 by injection molding. In this design, injection molding the second shell body 112 and the first shell body 111 can effectively reduce processing difficulty of the first shell body 111 and the second shell body 112.

In a second embodiment, the sealing element 13 is integrated with the second shell body 112 by injection molding. In this design, on the one hand, the integrated injection molding design of the sealing element 13 can effectively reduce processing difficulty of the sealing element 13 and the second shell body 112, and on the other hand, it can better seal the connecting points of the first port 111*b* of the first shell body 111 and the second port 12*a* of rear shell 12, which reduces the possibility of damaging electronic components, such as those inside the lighting lamp head 10, due to water seepage owing to a gap at a connection point between the first port 111*b* of the first shell body 111 and the second port 12*a* of the rear shell 12.

It should be noted that the first shell body 111 is molded by hard plastic to ensure the overall structural strength of the front shell 11; the sealing element 13 and the second shell body 112 are molded by soft plastic to facilitate the processing of the sealing element 13 and the design of corresponding switch buttons on the second shell body 112.

Figure 4:
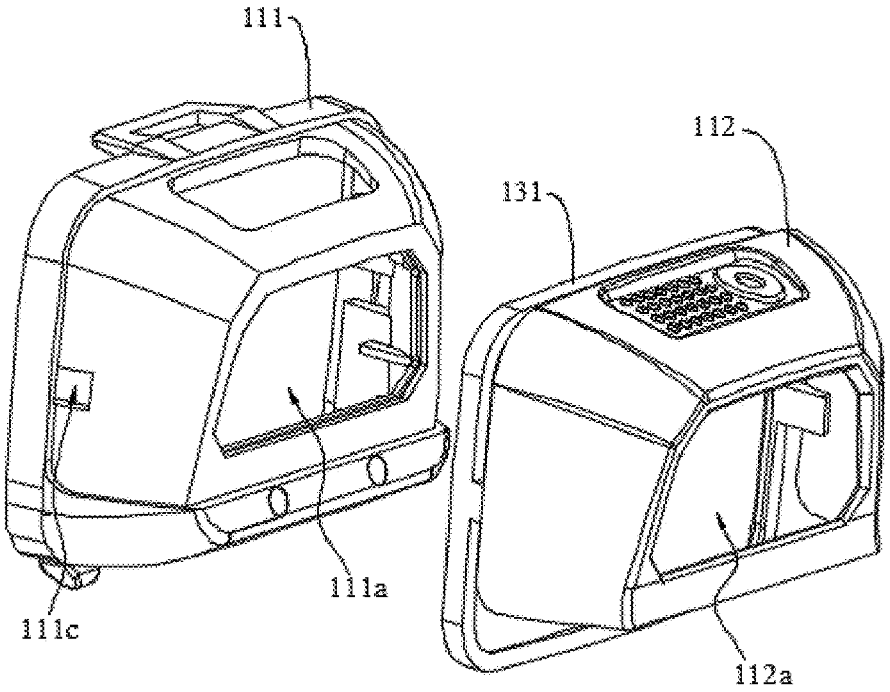
FIG. 4 is an exploded view of a front shell according to an embodiment of the present disclosure.
Figure 5:
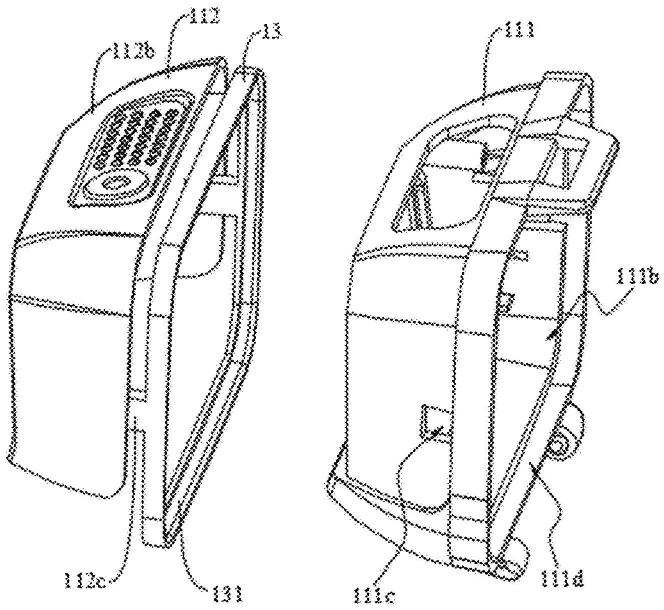
FIG. 5 is another view of the front shell of FIG. 4.

Further, as shown in FIGS. 4-5, the sealing element 13 includes an annular sealing ring 131; the first shell body 111 is provided with two perforations 111*c*, the second shell body 112 includes a shell body part 112*b* and two connecting ends 112*c*, the shell body part 112*b* is provided outside the first shell body 111, the two connecting ends 112*c* are provided on a side of the shell body part 112*b* facing the second port 12*a* of the rear shell 12, and the two connecting ends 112*c* correspondingly pass through the two perforations 111*c* and are connected to the annular sealing ring 131. The specific preparation material of the annular sealing ring 131 may be, but is not limited to, elastomeric silicone, elastomeric rubber, or TPE (Thermoplastic elastomer). In this design, by designing the sealing element 13 as an annular sealing ring 131, the annular sealing ring 131 is able to achieve circumferential sealing of the first port 111*b* of the first shell body 111 and the second port 12*a* of the rear shell 12 at the connecting points, so as to effectively enhance the sealing effect of the shell assembly 10*a*; by designing the two connecting ends 112*c* of the second shell body 112 correspondingly passing the two perforations 111*c* of the first shell body 111 and connected to the annular sealing ring 131, the connection between the second shell 112 and the annular sealing ring 131 may be stable.

Of course, in some other embodiments, the sealing element 13 may also include a plurality of (more than two) sealing flanges (not shown), the plurality of sealing flanges are spaced apart along a circumferential direction of the first port 111*b* of the first shell body 111, the first shell body 111 correspondingly has a plurality of perforations 111*c* in a number equal to the number of sealing flanges, the second shell body 112 includes a plurality of connecting ends 112*c* in a number equal to the number of the sealing flanges, and each connecting end 112*c* of the second shell body 112 passes through the corresponding perforation 111*c* and is connected to the corresponding seal flange.

Furthermore, as shown in FIGS. 4-5, the annular sealing ring 131 has a L-shaped section along a direction perpendicular to a circumferential direction of the annular sealing ring 131 (that is, along an extending direction perpendicular to the annular sealing ring 131). In this design, by designing the section of the annular sealing ring 131 as L-shaped, the annular sealing ring 131 can effectively seal both the front and sides of the first shell body 111 to further enhance the sealing performance of the shell assembly 10*a*.

Of course, in some other embodiments, the section of the annular sealing ring 131 may also be circular or rectangular along the direction perpendicular to the circumferential direction of the annular sealing ring 131.

Furthermore, as shown in FIGS. 4-5, the first port 111*b* of the first shell body 111 has a recess 111*d* at the edge, and the sealing element 13 is embedded in the recess 111*d*. In this design, by designing the recess 111*d* at the edge of the first port 111*b* of the first shell body 111 and the sealing element 13 embedded in the recess 111*d*, a contacting area between the sealing element 13 and the first shell body 111 can be increased, which improves the connection stability between the sealing element 13 and the first shell body 111.

Figure 6:
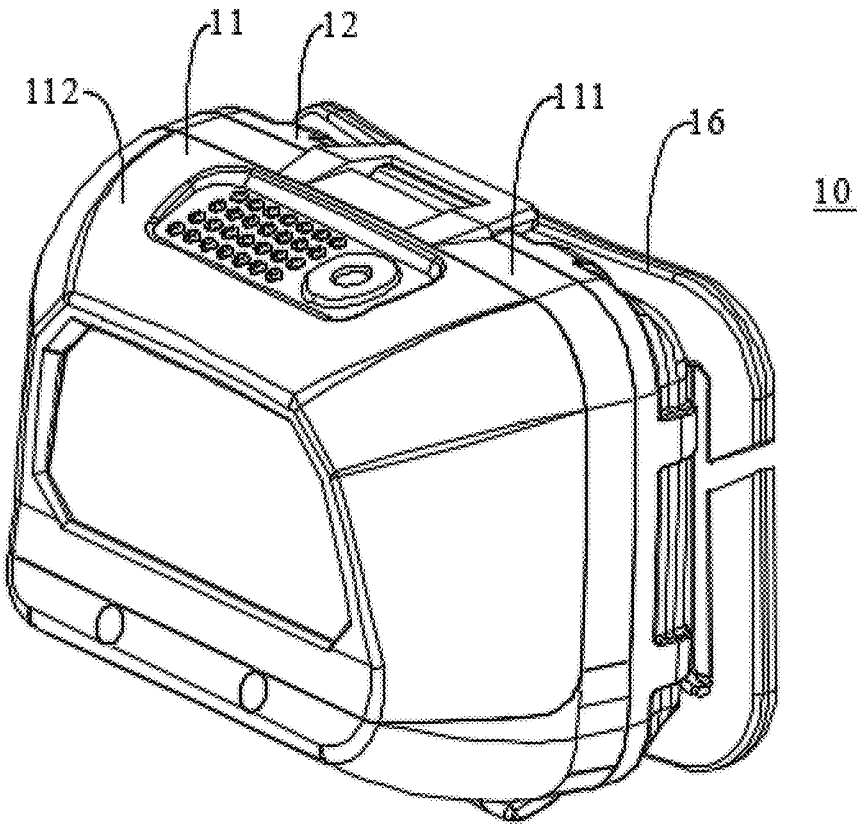
FIG. 6 is a view of a lighting lamp head according to an embodiment of the present disclosure.
Figure 7:
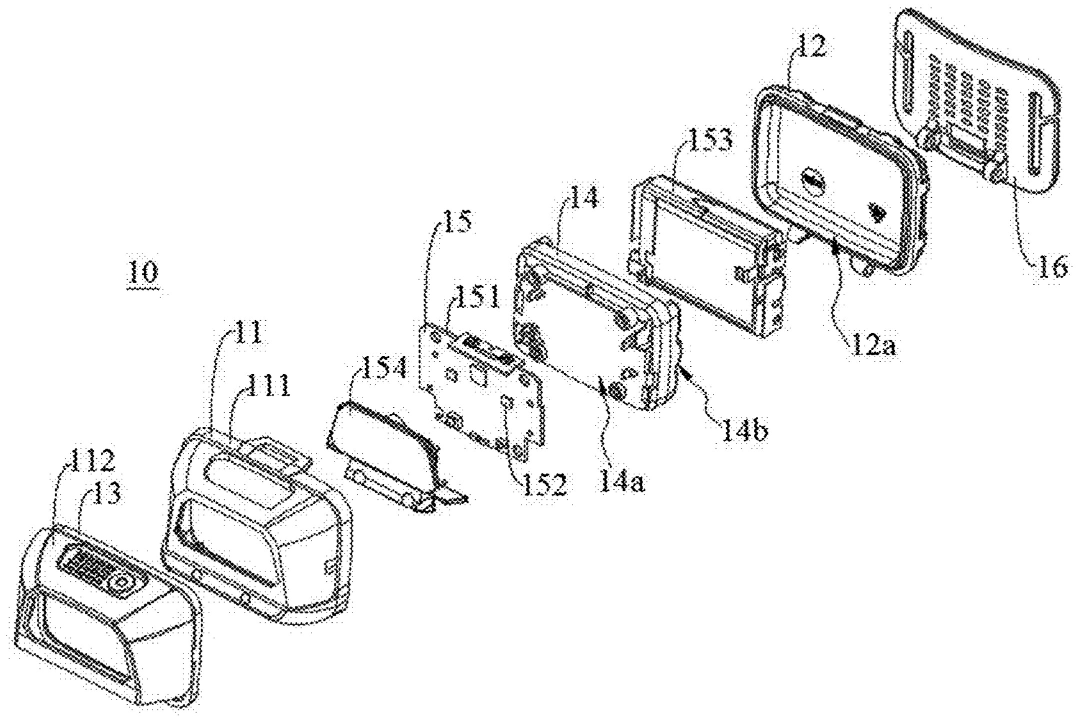
FIG. 7 is an exploded view of a lighting lamp head according to an embodiment of the present disclosure.

Referring to FIGS. 6-7, a second aspect of the present disclosure presents a lighting lamp head 10 with good sealing performance, which effectively reduces the possibility of water vapor entering the lighting lamp head and damaging electronic components.

The lamp head 10 includes a photovoltaic unit 15 and the shell assembly 10*a* described above, the first shell body 111 and the second shell body 112 have corresponding lighting passages, the photovoltaic unit 15 is at least partially located in the accommodating cavity and arranged corresponding to the lighting passages.

In some embodiments, the lighting passage is an area for the light passing through the front shell 11 and projected by a light source 152 relating to the photovoltaic unit 15 on the first shell body 111 and the second shell body 112. The lighting passage may be a non-solid light transmission device or a solid light transmission device. For example, when the lighting passage is a non-solid light transmission device, the lighting passage of the first shell body 111 corresponds to a first light outlet 111*a*, the first light outlet 111*a* is an opening of the first shell body 111 through which illumination light projected by the light source 152 for the photovoltaic unit 15 passes towards the front shell 11. The specific shape of the first light outlet 111*a* is not limited herein, a designer may design it according to actual requirements, for example, the specific shape of the first light outlet 111*a* may be, but not limited to, round or rectangular. The lighting passage of the second shell body 112 is configured as a second light outlet 112*a*, the second light outlet 112*a* is an opening of the second shell body 112 through which illumination light projected by the light source 152 for the photovoltaic unit 15 passes towards the front shell 11. The specific shape of the second light outlet 112*a* is not limited herein, a designer may design it according to actual requirements, for example, the specific shape of the second light outlet 112*a* may be, but not limited to, round or rectangular. The first light outlet 111*a* of the first shell body 111 and the second light outlet 112*a* of the second shell 112 are provided in correspondence, such that the illumination light projected by the light source 152 of the photovoltaic unit 15 passes through the first light outlet 111*a* and the second light outlet 112*a* in turn and transmits outside the front shell 11, so as to realize the illumination effect. For example, when the lighting passage is a solid light transmission device, the lighting passages of the first shell body 111 and the second shell 112 may be configured as lenses 154, and the lenses 154 may be, but are not limited to, formed into a one-piece structure with the first shell body 111 and the second shell 112 by means of injection molding.

The photovoltaic unit 15 is at least partially disposed in the accommodating cavity and is provided corresponding to the lighting passage, so that the illumination light projected by the photovoltaic unit 15 can directly pass through the lighting passage and leave the front shell 11 to realize the lighting effect.

Based on the lighting lamp head 10 in the embodiment of the present disclosure, by designing the sealing element 13 and setting it at the edge of the first port 111*b* of the first shell body 111, the sealing element 13 can provide a good sealing effect on the connecting position of the first port 111*b* of the first shell body 111 and the second port 12*a* of the rear shell 12, which effectively reduces the possibility of water vapor entering the accommodating cavity from the connection point between the first port 111*b* of the first shell body 111 and the second port 12*a* of the rear shell 12 and damaging the photovoltaic unit 15, thereby effectively reducing a safety hazard of the lighting lamp head 10. By designing the first shell body 111 and the second shell body 112, the front shell 11 forms an inner and outer nested double shell structure, the structural strength of the front shell 11 can be effectively enhanced to achieve the purpose of enhancing the overall structural strength of the lighting lamp head 10, thereby enhancing the drop-proof performance of the lighting lamp head 10. By designing the second shell body 112 to be integral with the first shell body 111, and the sealing element 13 to be integral with the second shell body 112, processing difficulty of the lighting lamp head 10 as a whole can be effectively reduced.

Further, as shown in FIGS. 6-7, the lighting lamp head 10 further includes a mounting seat 14 disposed within the accommodating cavity and connected to at least one of the first shell body 111 and the rear shell 12, the photovoltaic unit 15 is mounted to the mounting seat 14.

In some embodiments, the mounting seat 14 serves as a carrier of the photovoltaic unit 15, and the specific structure of the mounting seat 14 is not limited here, and a designer may reasonably design it according to actual requirements. For example, the mounting seat 14 may be, but is not limited to, a plate structure or a frame structure. The mounting seat 14 may be connected only to the first shell body 111, only to the rear shell 12, or both to the first shell body 111 and to the rear shell 12. The specific connection between the mounting seat 14 and the first shell body 111 (or the rear shell 12) is not limited here, and a designer may reasonably design it according to actual requirements. For example, when the mounting seat 14 is detachably connected to the first shell body 111 (or the rear shell 12), the mounting seat 14 may be, but is not limited to, fixedly connected to the first shell body 111 (or the rear shell 12) by at least one of screwing, snapping, or plugging. For example, when the mounting seat 14 is non-detachably connected to the first shell body 111 (or the rear shell 12), the mounting seat 14 may be, but is not limited to, fixedly connected to the first shell body 111 (or the rear shell 12) by means of a glued connection.

By designing the mounting seat 14, the mounting seat 14 on the one hand serves as a carrier of the photovoltaic unit 15 for carrying the photovoltaic unit 15, and the mounting seat 14 on the other hand is equivalent to a reinforcing bar arranged in the accommodating cavity formed by the enclosure of the first shell body 111 and the rear shell 12, which is capable of reinforcing the structural strength of the front shell 11 and the rear shell 12.

Further, as shown in FIG. 7, the mounting seat 14 has a first side 14*a* facing the lighting passage and a second side 14*b* opposite to the lighting passage; the photovoltaic unit 15 includes a circuit board 151, a light source 152, and a battery 153; the circuit board 151 is located on the first side 14*a* of the mounting seat 14 and is connected to the mounting seat 14; the light source 152 is disposed on a side of the circuit board 151 facing the lighting passage; the battery 153 is disposed on the second side 14*b* of the mounting seat 14 and is connected to the mounting seat 14, and the battery 153 is electrically connected to the circuit board 151.

In some embodiments, the first side 14*a* of the mounting seat 14 and the second side 14*b* of the mounting seat 14 are spaced apart in a direction perpendicular to a plane in which the lighting passage (specifically, the light outlet) is located. The specific connection between the circuit board 151 and the mounting seat 14 is not limited here, and a designer may reasonably design it according to actual requirements. For example, when the circuit board 151 is detachably connected to the mounting seat 14, the circuit board 151 may be, but is not limited to, fixedly connected to the mounting seat 14 by at least one of screwing, snap-fitting, or plug-fitting. As another example, when the circuit board 151 is non-detachably connected to the mounting seat 14, the circuit board 151 may be, but is not limited to, fixedly connected to the mounting seat 14 by means of a glued connection. The circuit board 151 may be a rigid circuit board 151, a flexible circuit board 151, or a semi-rigid circuit board 151. It should be noted that when the circuit board 151 is a flexible circuit board 151 or a semi-rigid circuit board 151, the photovoltaic unit 15 further includes a reinforcement plate (not shown in the figures), which is provided between the flexible circuit board 151 (or the semi-rigid circuit board 151) and the first side 14*a* of the mounting seat 14 to provide support to the flexible circuit board 151 (or the semi-rigid circuit board 151). The light source 152 may, but is not limited to, be a LED light. The specific connection between the battery 153 and the mounting seat 14 is not limited herein, and a designer may reasonably design it according to actual requirements. For example, when the connection between the battery 153 and the mounting seat 14 is removable, the battery 153 may be, but is not limited to, fixedly connected to the mounting seat 14 by means of a snap-fit. The battery 153 may be a storage battery 153 or a dry cell 153. If the battery 153 is a storage battery 153 and the rear shell 12 is removably connected to the first shell body 111, when the battery 153 has a low or zero charge, a user may remove the rear shell 12 and then remove the battery 153 to charge the battery 153 with the aid of an external charger, or the user may charge the battery 153 directly with the aid of a charging cable connected to a charging port of the lighting lamp head 10. If the battery 153 is a dry cell 153 and the rear shell 12 is removably connected to the first shell body 111, when the battery 153 is too low or zero, the user may remove the rear shell 12 and remove the old battery 153 and replace it with a new cell 153.

By designing the circuit board 151, the light source 152 and the battery 153, the battery 153 realizes an electrical connection with the light source 152 through the circuit board 151 to provide the light source 152 with electrical energy required for illumination.

Of course, the photovoltaic unit 15 also includes a lens 154, the lens 154 is disposed on a light outlet side of the light source 152, the lens 154 may be, but is not limited to, fixedly connected to the first shell body 111 by means of locking screws or injection molding, and the lens 154 is transparent, at which time the lens 154 corresponds to the lighting passages of the first shell body 111 and the second shell 112.

A third aspect of the present disclosure proposes a headlamp device with good sealing performance, which can effectively reduce the possibility of water vapor entering the interior of the lighting lamp headlamp and damaging electronic components.

The headlamp device includes a head-wear assembly (not shown in the figures) and the above-described lighting lamp head 10; the above-described lighting lamp head 10 further includes a mounting bracket 16 rotatably connected to the rear shell 12, the mounting bracket 16 has a light head mounting feature; the head-wear assembly is connected to the mounting bracket 16 corresponding to the light head mounting feature. In some embodiments, the specific structure of the mounting bracket 16 is not limited herein, and a designer may reasonably design the mounting bracket 16 according to actual requirements, for example, the mounting bracket 16 may be, but is not limited to, a plate-like structure or a grille structure. The rotational connection means of the mounting bracket 16 and the rear shell 12 is not limited herein, and a designer may reasonably design it according to actual requirements, for example, the mounting bracket 16 may, but is not limited to, be rotatably connected to the rear shell 12 by a rotation shaft.

The headlamp device according to the embodiment of the present disclosure includes the above-described lighting lamp head 10, the sealing element 13 can provide a good sealing effect on the connecting position of the first port **111*b* of the first shell body 111 and the second port 12*a* of the rear shell 12, which effectively reduces the possibility of water vapor entering into the accommodating cavity from the connecting point of the first port 111*b* of the first shell body 111 and the second port 12*a* of the rear shell 12, thereby effectively reducing the possibility of damaging the photovoltaic unit 15, thereby effectively reducing the safety hazard of the lighting lamp head 10. By designing the mounting bracket 16 and the head-wear assembly, the head-wear assembly makes the lighting lamp head 10 and the head-wear assembly form an integral structure by means of the mounting bracket 16, and the lighting lamp head can be worn on a user's head by means of the head-wear assembly without requiring the user to hold the lighting lamp head 10, which frees the user's hands, and provides convenience for the user in the disclosure in scenarios, for example, hiking or cycling. By designing the mounting bracket 16, the rear shell 12 is rotatably connected to the mounting bracket 16, so that the user can rotate the rear shell 12 to adjust a lighting angle of the lighting lamp head 10** according to actual requirements, further enhancing the convenience of use of the headlamp device.

In some embodiments, the lamp head mounting feature is a mounting through-hole formed in the mounting bracket 16; the head-wear assembly includes a headband body (not shown) and an adjustable buckle (not shown); an end portion of the headband body passes through the mounting hole of the mounting bracket 16 and is connected to the mounting bracket 16; and the adjustable buckle is provided to the headband body to make a length of the headband body adjustable. In some embodiments, the headband body may, but is not limited to, be a flat elastic cord. By designing the headband body and the adjusting buckle, the user can adjust the position of the adjusting buckle according to actual needs to change the length of the headband body, thereby adapting to be worn by users with different head circumferences.

Of course, in some other embodiments, the lamp head mounting feature may be configured as two mounting through-holes formed in the mounting bracket 16. The head-wear assembly includes a headband body, the headband body includes a left side headband and a right side headband, a head of the left side headband passes through one of the mounting through-holes of the mounting bracket 16 and is connected to the mounting bracket 16, and a head of the right side headband passes through the other mounting through-hole of the mounting bracket 16 and is connected to the mounting bracket 16. The head-wear assembly further includes a clasp, the clasp includes a male clasp and a female clasp, the male clasp is connected to one of a tail portion of the left-side headband and a tail portion of the right-side headband, and the female clasp is connected to the other of the tail portion of the left-side headband and the tail portion of the right-side headband. The left-side headband and the right-side headband are connected by means of snap fit of the male clasp and the female clasp.

In some embodiments, an intelligent control module is also provided in the headlamp device. For example, the intelligent control module may include, such as, a voice control module 155 and a low temperature alarm 156.

Figure 8:
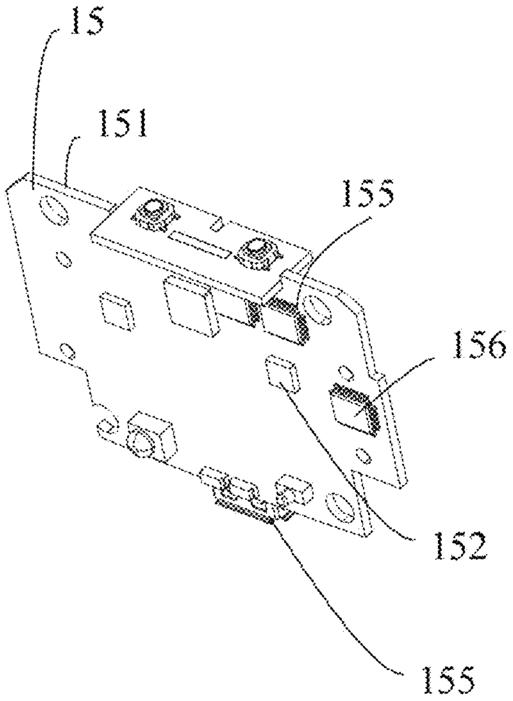
FIG. 8 is a view of a photovoltaic unit according to an embodiment of the present disclosure.

In a specific embodiment, as shown in FIG. 8, the headlamp device is further provided with a voice control module 155. Specifically, the voice control module 155 is integrated in the photovoltaic unit 15, and the photovoltaic unit 15 supplies power to the voice control module 155. The voice control module 155 includes a voice recognition chip, such as NRK3301, WTK6900. With the voice control module 155, voice control can be performed by voice in both offline and online scenarios. With such a voice control module 155, the following scenarios are possible: the headlamp is worn on a head of a user and other equipment is hold by hands of the user, when the headlamp requires to be turned on or off, the headlamp can be turned on or off by saying "turn on the light" or "turn off the light" by voice to control "On" or "Off" of the headlamp.

In a specific embodiment, as shown in FIG. 8, the headlamp device is further provided with a low temperature alarm 156. Specifically, the low-temperature alarm is provided in the photovoltaic unit 15, and the low-temperature alarm 156 is powered through the circuit board 151. The low temperature alarm is capable of measuring a temperature range of −10 degrees to 50 degrees, and the present technical solution can set a threshold according to actual requirements, so that an alarm (such as, voice alarm, sound and light alarm) is generated, when the ambient temperature is within the set threshold range, to remind the user that the temperature is low. When the temperature is low, for example, when the set alarm temperature is a range of 6-12 degrees, the user is reminded to increase clothes or make other preparations to avoid catching a cold, which affects the outdoor entertainment experience.

Figure 11:
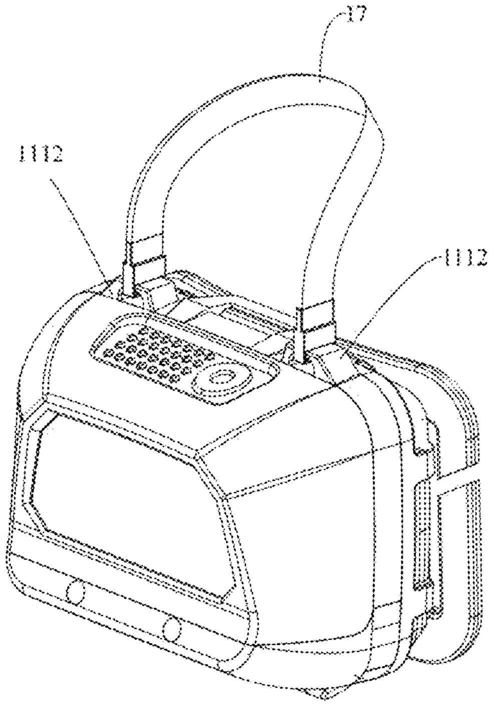
FIG. 11 is a view of a lighting lamp head with a handle according to an embodiment of the present disclosure.

In some embodiments, as shown in FIG. 11, the headlamp device is further provided with a handle 17. The provided handle 17 may be used in the following scenarios: when the user does not want to wear it on the head or when the head is injured, the handle 17 may be carried by holding it with a hand of the user. Specifically, a first connecting portion 1112 is provided on each side of the second shell 112, and two ends of the handle 17 are each connected to the first connecting portion 1112. The handle 17 may be made of a cloth belt or other materials. The headlamp device is provided with the handles 17, the headlamp device may be suspended by a support or other member of the tent by the handles 17 for lighting when a tent outdoors is pitched.

Figure 9:
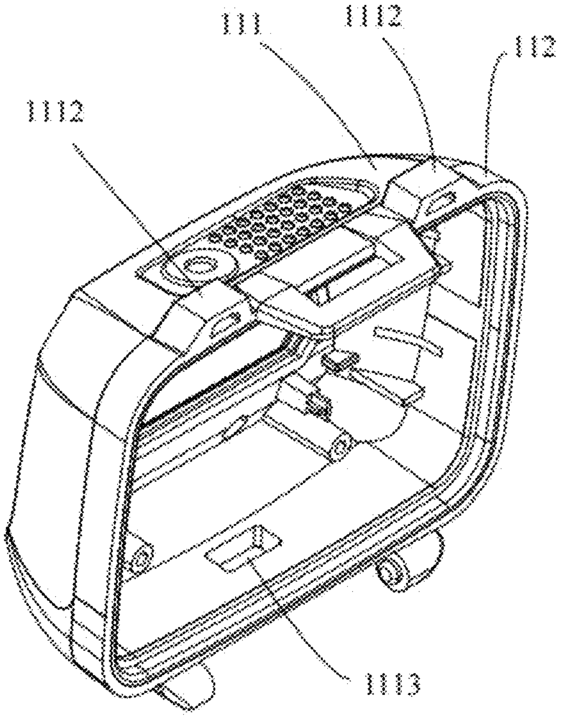
FIG. 9 is a view of a front shell according to an embodiment of the present disclosure.
Figure 10:
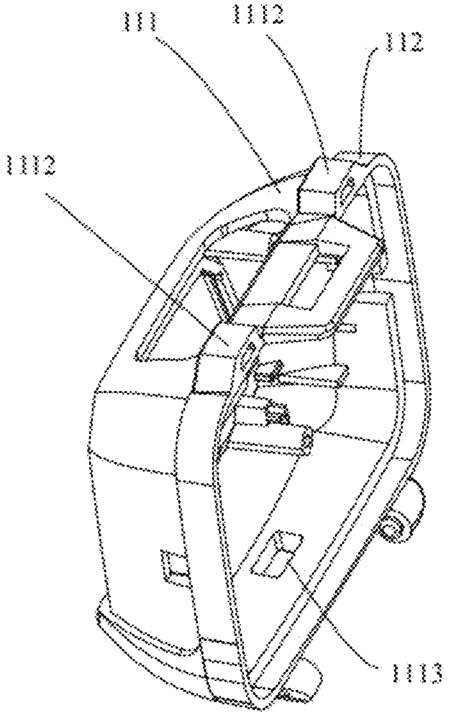
FIG. 10 is a view of a second shell body according to an embodiment of the present disclosure.

In some embodiments, the headlamp device is also provided with a USB output interface 155 for charging other electronic products. Specifically, as shown in FIG. 8, the USB output interface 155 is provided in the photovoltaic unit 15. As shown in FIGS. 9-10, a USB hole is provided at a bottom of the second shell 112, and the USB hole is corresponding to the USB output interface 155 to allow the USB output interface 155 to extend outwardly from the interior of the second shell 112, but the USB output interface 155 extends no further than the outer wall of the second shell 112. The interface type of the USB output interface 155 may be USB3, USB4, or type-c. when other electronic devices are low on battery, the headlamp device provided with the USB output interface 155 may charge the other electronic devices.

In the drawings of this embodiment, identical or similar reference numerals correspond to identical or similar components. In the description of this application, it should be understood that if terms such as "upper", "lower", "left", "right", etc., are used to indicate orientation or positional relationships, they are based on the orientation or positional relationships shown in the drawings, solely for the purpose of facilitating the description of this application and simplifying the description, and are not intended to indicate or imply that the device or element referred to must have a specific orientation, be constructed or operated in a specific orientation. Therefore, the terms used in the drawings to describe positional relationships are merely illustrative and cannot be construed as limiting the present patent. For those skilled in the art, the specific meanings of the above terms can be understood according to specific circumstances.

The foregoing is only a better embodiment of this disclosure and is not used to restrict this disclosure, and any modification, equivalent substitution and improvement made within the spirit and principles of this disclosure shall be included within the protection scope of this disclosure

The invention claimed is:

1. A shell assembly, applied to a lighting lamp head, the shell assembly comprising:

a rear shell comprising a second port;

a front shell comprising a first shell body and a second shell body, the first shell body comprising a first port, wherein the first shell body is connected to the rear shell and enclosed with the rear shell to form an accommodating cavity, a portion of the second shell body extends through the first shell body, the second shell body encloses an outer side of the first shell body and is integrated with the first shell body to form a nested double-shell structure with the first shell body and the second shell body; and a sealing element arranged in the second shell body and integrated therewith by injection molding, when the first shell body is connected to the second shell body, the first port of the first shell body is connected to the second port of the rear shell, the sealing element arranged in the accommodating cavity and disposed at an edge of the first port of the first shell body to seal a connection between the first port of the first shell body and the second port of the rear shell.

2. The shell assembly according to claim 1, wherein, the second shell body is integrated with the first shell body by injection molding.

3. The shell assembly according to claim 1, wherein, the sealing element comprises an annular sealing ring;

the first shell body comprises two perforations, the second shell body includes a shell body part and two connecting ends, the shell body part encloses outside the first shell body, the two connecting ends are arranged on a side of the shell body part facing the second port of the rear shell, and the two connecting ends correspondingly extend through the two perforations and are connected to the annular sealing ring.

4. The shell assembly of claim 3, wherein, a cross-section of the annular sealing ring is a L-shaped section along a direction perpendicular to a circumferential direction of the annular sealing ring.

5. The shell assembly of claim 1, wherein, the first port of the first shell body is provided with a recess at its edge, and the sealing element is embedded in the recess.

6. A lighting lamp head, comprising:

the shell assembly according to claim 1, wherein the first shell body and the second shell body each have a lighting passage; and a photovoltaic unit at least partially located in the accommodating cavity and arranged corresponding to the lighting passage.

7. The lighting lamp head according to claim 6, wherein the lighting lamp head further comprises a mounting seat located in the accommodating cavity and connected to at least one of the first shell body and the rear shell, and the photovoltaic unit is mounted to the mounting seat.

8. The lighting lamp head of claim 7, wherein the mounting seat is provided with a first side facing the lighting passage and a second side opposite to the lighting passage; and the photovoltaic unit comprises:

a circuit board located on the first side of the mounting seat and connected to the mounting seat;

a light source provided on a side of the circuit board facing the lighting passage and electrically connected to the circuit board; and a battery located on the second side of the mounting seat and connected to the mounting seat, the battery is electrically connected to the circuit board.

9. A headlamp device, comprising:

the lighting lamp head according to claim 6, wherein the lighting lamp head further comprises a mounting bracket rotatably connected to the rear shell, the mounting bracket is provided with a lamp head mounting feature; and a head-wear assembly connected to the lamp head mounting feature corresponding to the mounting bracket.

10. The headlamp device of claim 9, wherein the lamp head mounting feature is a mounting hole formed in the mounting bracket, and the head-wear assembly comprises:

a headband body, an end of the headband body extends through the mounting hole and connected to the mounting bracket; and an adjustable buckle provided on the headband body and configured for adjusting a length of the headband body.

* * * * *